United States Patent Office 3,526,532
Patented Sept. 1, 1970

3,526,532
METAL ARTICLE COATED WITH ACRYLIC OR VINYL PRIMER AND HYDROFLUOROCARBON TOPCOAT
Philip Heiberger, Philadelphia, Pa., assignor to E. I. du Pont de Nemours and Company, Wilmington, Del., a corporation of Delaware
No Drawing. Continuation-in-part of application Ser. No. 406,166, Oct. 23, 1964. This application Jan. 30, 1969, Ser. No. 795,336
Int. Cl. B44d 1/14; B32b 15/08
U.S. Cl. 117—75                                   7 Claims

ABSTRACT OF THE DISCLOSURE

A finishing system for metals which comprises a primer coat of an acrylic- or vinyl polymer and a topcoat of a hydrofluorocarbon polymer, and the coated metal article.

CROSS REFERENCE TO RELATED APPLICATION

This application is a continuation-in-part of application Ser. No. 406,166, filed Oct. 23, 1964 and now abandoned.

BACKGROUND OF THE INVENTION

This invention relates to a novel finishing system for metals. It is more particularly directed to a finishing system in which the adhesion of a hydrofluorocarbon polymer topcoat, formed in situ, is greatly enhanced by applying it over a primer coat having a polymer of a monoethylenically unsaturated monomer as its principal film-forming component.

Hydrofluorocarbon polymer coating compositions, when applied to metal substrates, generally do not confer the corrosion resistance one might expect from the chemical nature of the polymers. This is due in large measure to insufficient adhesion between the films, formed by the hydrofluorocarbon polymer coating compositions, and their metal substrates. I have discovered that the adhesion of such coating compositions to metal substrates can be greatly enhanced and that the corrosion resistance of the finished articles is accordingly also enhanced if the hydrofluorocarbon polymer compositions are applied over acrylic or vinyl primer coats.

SUMMARY OF THE INVENTION

The acrylic- or vinyl primer coats are derived from liquid compositions which have from 75 to 90%, by weight, of polymers or copolymers, or blends of these, of monoethylenically unsaturated monomers as their principal film-forming components. Illustrative of such monomers are itaconic acid, maleic acid, fumaric acid, acrylic acid, methacrylic acid, acrylonitrile, alkyl acrylates or 4 through 11 (total) carbon atoms; alkyl methacrylates of 5 through 12 (total) carbon atoms; vinyl esters such as vinyl acetate; and aromatic vinyl compounds such as styrene or vinyl toluene.

Illustrative of copolymers which can be used in the primer compositions are vinyl acetate/ethyl acrylate copolymers, styrene/ethyl hexyl acrylate copolymers, styrene/maleic acid copolymers, styrene/fumaric acid copolymers, methyl methacrylate/ethyl acrylate/methacrylic acid terpolymers, and acrylonitrile/butyl acrylate/methacrylic acid terpolymers. The methyl methacrylate/ethyl acrylate/methacrylic acid terpolymers and the acrylonitrile/butyl acrylate methacrylic acid terpolymers are preferred.

The primer compositions are pigmented conventionally. I have found that titanium dioxide gives the best results. This pigment can be used by itself or can be blended with others such as, for example, carbon black. In either case, the pigments are added to the primer compositions in proportions ranging from 0.5 to 20%, by weight of the total composition.

The corrosion resistance of my finishing system can be greatly enhanced if from 1 to 10%, by weight of the total composition, of strontium chromate is present in the primer. I prefer strontium chromate as a corrosion inhibitor because it does not gel the acrylic or vinyl latex.

The pH of the primer compositions should range between 7.6 and 9 to prevent gelation. To bring the primer composition to within this pH range, I add a tertiary amine.

I have also found it desirable to add a melamine/formaldehyde resin such as Super Beckamine 93-200 [1] to the primer compositions, in proportions ranging from 1 to 5%, of the vehicle. Such resins act as cross-linking agents.

Surfactants, wetting agents, and emulsifying agents can also be present in the primer compositions, in the usual amounts.

Although the beneficial effects of my invention will be obtained by using such a primer composition with a topcoat composition having any hydrofluorocarbon polymer with a fusion point below the degradation point of the primer as its main film-forming component, I prefer to use those topcoat compositions disclosed in my copending application Ser. No. 406,167 filed Oct. 23, 1964, and now abandoned because of the superior gloss and color retention of their finishes. Illustrative of the hydrofluorocarbon polymers which can be used in these topcoat compositions are polyvinyl fluoride, polyvinylidene fluoride, vinyl fluoride/vinylidene fluoride copolymers, and copolymers of vinyl fluoride or vinylidene fluoride with at least one other halogen substituted ethylenically unsaturated monomer. The hydrofluorocarbon polymers can also be terpolymers of vinyl fluoride or vinylidene fluoride with alkyl acrylates of 4 through 11 (total) carbon atoms, alkyl methacrylates of 5 through 12 (total) carbon atoms, tetrafluoroethylene or bis-(2-chloroethyl)-vinyl phosphonate. I prefer to use topcoat compositions containing polyvinylidene fluoride or polyvinyl fluoride.

The hydrofluorocarbon polymers are present in these topcoat compositions at concentrations of from 50% to 100%, by weight of the film-forming components.

The hydrofluorocarbon polymers can be present in the topcoating compositions as solutions in such volatile organic solvents as dimethylformamide, nitroparaffins, aniline, cyclohexanone or dibutyl ketone, or they can be present as dispersions in organic solvents (organosols) or in water (latices). Illustrative of the organic solvents which can be used to form organosols are dimethylsulfoxide, propylene carbonate, dimethylformamide, dimethylacetamide and the like. It may be desirable to use these solvents in combination with aromatic hydrocarbon solvents such as xylene, mesitylene and ethylbenzene.

These hydrofluorocarbon topcoat compositions can be pigmented with titanium dioxide of the rutile type. Other pigments, however, may be used in combination with ---
[1] Reichhold Chemicals Co.

titanium dioxide. The pigments will ordinarily be present at concentrations of from about 5% to about 40%, based on the total volume of non-volatile components. Preferably, the compositions contain 15% through 30% of pigments.

Hydrofluorocarbon topcoat compositions which give finishes having superior gloss and color retention also contain an auxiliary acrylic polymer component. This component can be, for example, a polymer or copolymer of an alkyl acrylate of 4 through 11 carbon atoms, an alkyl methacrylate of 5 through 12 carbon atoms, or blends of these polymers or copolmers. Also suitable are the methyl methacrylate/3-($\beta$-methacryloxyethyl) - 2,2 - spirocyclohexyloxazolidine (MESO) copolymers described in U.S. Pat. 3,037,006. These auxiliary polymers are present in proportions of from 50/50 to 0.1/99.9 to the fluorocarbon polymer.

The gloss and color retention of the hydrofluorocarbon topcoat composition finishes are also greatly enhanced by the presence of $Sb_2O_3$ in a $TiO_2/Sb_2O_3$ ratio of from 5/1 to 15/1.

The primer composition are made by milling the pigment and the strontium chromate (if it is used) in water. This mill base is then added to the acrylic or vinyl ester latex. The viscosity is adjusted to the proper point and the pH is then adjusted by the addition of a tertiary amine.

The hydrofluorocarbon polymer topcoat compositions are made as I describe in my copending application Ser. No. 406,167, filed Oct. 23, 1964. Briefly, these compositions are prepared by dispersing or dissolving the hydrofluorocarbon polymers in suitable liquids. The $TiO_2$ and $Sb_2O_3$ are separately ground in a ball mill or sand mill and the resulting dispersion is added to the hydrofluorocarbon polymer dispersion and thoroughly mixed. If a third polymeric component is used, a dispersion is made of this polymer in the usual way and this is then mixed with the pigment dispersion, which is then added to the hydrofluorocarbon polymer dispersion.

The primer compositions and the topcoat compositions are, of course, applied in sequence. It is essential that the primer be applied to a clean metal surface, and I therefore prefer that the article being coated be first sand or shot blasted, pickled with acid or phosphatized. The primer can be applied in any of the conventional ways such as brushing, rollercoating, dipping or spraying. The primer coat is then dried and baked, preferably at a temperature of about 450° F. for about 1-2 minutes, or an equivalent baking cycle.

The hydrofluorocarbon polymer topcoat is then applied. This too is applied by conventional methods such as spraying, dipping, brushing, flow coating, extruding, doctor blading or rolling. However the topcoat is applied, the article coated is then heated to a temperature of about 425° F. for about 2 minutes (or an equivalent of this) to form, in situ, a tough, durable, corrosion-resistant finish having greatly enhanced gloss and color retention. The topcoat requires no special treatments to insure bonding to the primer coat.

The combination of acrylic or vinyl ester primer and hydrofluorocarbon polymer topcoat brings out all of the toughness and durability inherent in hydrofluorocarbon polymer systems and gives the most inert, long-lasting finish possible, so far as I know, with such systems. Because of this blend of desirable characteristics, my finishing system is especially useful in coating metal articles which are subsequently formed or shaped. But this is not to say that my system is less useful for coating other substrates which can withstand the curing temperatures used. On the contrary, my system gives exceptionally durable finishes on these substrates as well.

DESCRIPTION OF PREFERRED EMBODIMENTS

My invention is disclosed in greater detail in the examples which follow. It should be understood that these examples show only the preferred embodiments of my invention. Many variations of these are of course possible. I am sure that anyone skilled in the art can extrapolate from my teachings and formulate undisclosed systems which give all the beneficial effects of my invention. I naturally consider such systems to be within my basic inventive concept.

Example 1

An acrylic latex primer is prepared according to the following formula:

| | Parts |
|---|---|
| 39 methyl methacrylate/57 ethyl acrylate/4 methacrylic acid terpolymer latex, 40% solids | 60 |
| $TiO_2$ (rutile) | 16 |
| $SrCrO_4$ | 3.2 |
| Surfactant, wetting agent | 2 |
| Water | 14.8 |
| Water | 14.8 |

The pigment, wetting agent and surfactant are sand ground in water and then added to the latex and melamine formaldehyde resin. The pH is adjusted to 8-8.5 with a tertiary amine.

This composition is sprayed on a conversion coated (phosphate treated) steel panel to give a film about 0.2 mil thick. This is dried and baked at 450° F. for 75 seconds.

A hydrofluorocarbon polymer topcoat composition is prepared according to the following formula:

| | Parts |
|---|---|
| $TiO_2$ (rutile) | 33.75 |
| $Sb_2O_3$ | 3.75 |
| "Monastral" Pigment® (blue) | 1 |
| Polyvinylidene fluoride powder (0.3$\mu$ average diameter) | 53 |
| Methyl methacrylate/MESO (95/5) copolymer | 9.5 |
| Isophorone | 80 |
| Xylene | 80 |

These components are blended and run through a sand mill. The resulting coating composition is drawn on the previously primed steel panel to give a topcoat film about 1 mil thick. The panel is then dried and baked at 510° F. for about 90 seconds.

Example 2

An acrylic latex primer is prepared according to the following formula:

| | Parts |
|---|---|
| 35 acrylonitrile/62 butyl acrylate/3 methacrylic acid terpolymer latex, 40% solids | 60 |
| $TiO_2$ (rutile) | 16 |
| $SrCrO_4$ | 3.2 |
| Surfactant, wetting agent | 2 |
| Water | 18.8 |

These components are processed as in Example 1. The resulting composition is sprayed on a piece of sand blasted steel to give a film about 0.2 mil thick. This is dried and baked for 75 seconds at 450° F.

A hydrofluorocarbon polymer topcoat composition is prepared according to the following formula:

| | Parts |
|---|---|
| $TiO_2$ (rutile) | 32.4 |
| "Monastral" Pigment® (blue) | 4 |
| $Sb_2O_3$ | 3.6 |
| Vinylidene fluoride/tetrafluoroethylene/bis-chlorovinylphosphonate terpolymer, 76/22.5/1/5 [1] | 85 |
| Methyl methacrylate/methacrylic acid copolymer, 95/5 | 15 |
| Butyrolactone | 255 |

[1] Prepared according to procedures described in U.S. Pat. 3,318,850.

All the components are blended and then sand ground. The resulting composition is drawn onto the steel panel previously primed to give a 1 mil film. The panel is then dried and baked at 510° F. for 120 seconds.

The steel panels prepared in Examples 1 and 2 show no blisters or creepage along test scribe marks after 1000 hours of exposure in a salt-fog chamber. Comparable steel panels having no primer coat show ⅛ to ¼ inch creepage along the scribe after 250 hours.

I claim:

1. A metal article having a primer coat of a water insoluble film consisting essentially of a polymer or blend of polymers formed from monomers selected from the group consisting of an alkyl acrylate of 4 through 11 (total) carbon atoms, an alkyl methacrylate of 5 through 12 (total) carbon atoms, a vinyl ester, an aromatic vinyl compound, itaconic acid, maleic acid, fumaric acid, acrylic acid, methacrylic acid and acrylonitrile, overlaid with a topcoat film consisting essentially of a hydrofluorocarbon polymer having a fusion temperature below the degradation temperature of the primer polymer, said topcoat film being formed in situ.

2. The metal article of claim 1 whose primer coat comprises a film of a methyl methacrylate/ethyl acrylate/methacrylic acid terpolymer.

3. The metal article of claim 1 whose primer coat comprises a film of an acrylonitrile/butyl acrylate/methacrylic acid terpolymer.

4. The metal article of claim 2 whose topcoat film comprises polyvinyl fluoride.

5. The metal article of claim 3 whose topcoat film comprises polyvinyl fluoride.

6. The metal article of claim 2 whose topcoat film comprises polyvinylidene fluoride.

7. The metal article of claim 3 whose topcoat film comprises polyvinylidene fluoride.

References Cited

UNITED STATES PATENTS

| 2,760,886 | 8/1956 | Prentiss et al. | |
| 3,050,412 | 8/1962 | Coe. | |
| 3,306,766 | 2/1967 | Hathaway et al. | 117—75 X |

WILLIAM D. MARTIN, Primary Examiner

R. HUSACK, Assistant Examiner

U.S. Cl. X.R.

117—49, 132